US012238006B1

(12) United States Patent
Mahadevan et al.

(10) Patent No.: US 12,238,006 B1
(45) Date of Patent: Feb. 25, 2025

(54) SELF-HEALING SD-WAN CONTROLLERS AND NETWORKS

(71) Applicant: Cisco Technology, Inc., San Jose, CA (US)

(72) Inventors: Satish Kumar Mahadevan, San Ramon, CA (US); Sheikh M Qumruzzaman, Santa Clara, CA (US); Ravi Kiran Chintallapudi, Pleasanton, CA (US); Prosenjit Sarkar, Santa Clara, CA (US); Sourav Sen, San Jose, CA (US); Balaji Sundararajan, Fremont, CA (US); Rahul P Hardikar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/456,266

(22) Filed: Aug. 25, 2023

(51) Int. Cl.
    *G06F 15/173* (2006.01)
    *H04L 45/76* (2022.01)

(52) U.S. Cl.
    CPC .................................. *H04L 45/76* (2022.05)

(58) Field of Classification Search
    CPC .......................................................... H04L 45/76
    See application file for complete search history.

(56) References Cited

U.S. PATENT DOCUMENTS

| 2017/0222918 | A1 | 8/2017 | Sebastian et al. |
| 2020/0295998 | A1 | 9/2020 | Ranjbar et al. |
| 2021/0011825 | A1 | 1/2021 | Aggarwal et al. |
| 2021/0105212 | A1 | 4/2021 | Duan et al. |
| 2021/0288881 | A1 | 9/2021 | Zhang |
| 2021/0399920 | A1 | 12/2021 | Sundararajan et al. |
| 2021/0399978 | A9 | 12/2021 | Michael et al. |
| 2023/0052974 | A1 | 2/2023 | Thoria et al. |

OTHER PUBLICATIONS

International Search Report and Written Opinion for International Application No. PCT/US2024/043251, mailed Oct. 29, 2024, 13 Pages.
Sahoo K.S., et al., "ESMLB: Efficient Switch Migration-Based Load Balancing for Multicontroller SDN in IoT", IEEE Internet of Things Journal, IEEE, USA, vol. 7, No. 7, Jul. 2020, XP011798190, pp. 5852-5860, Nov. 7, 2019, DOI: 10.1109/JIOT.2019.2952527 [retrieved on Jul. 9, 2020], Figures 2, 3, Section 3.

*Primary Examiner* — Joseph R Maniwang
(74) *Attorney, Agent, or Firm* — Polsinelli P.C.

(57) ABSTRACT

Systems and methods are provided for re-balancing and healing of an SD-WAN in an unbalanced state and/or experiencing one or more failure states. In response to a request to connect to a new controller resulting from OMP load shedding from a first controller, the system can identify other controllers capable of handling the load requirements of the edge router. The system can incorporate the controller group preference of the edge router and select a second controller based on the identified other controllers and within the preferred controller group. If not possible, the system can temporarily assign the edge router to non-preferred controller groups and move them back to controllers in the preferred controller group once it becomes viable. The system further enhances OMP graceful restart (GR) logic to incorporate the load shedding effect and avoid unnecessary route retention that GR entails.

20 Claims, 9 Drawing Sheets

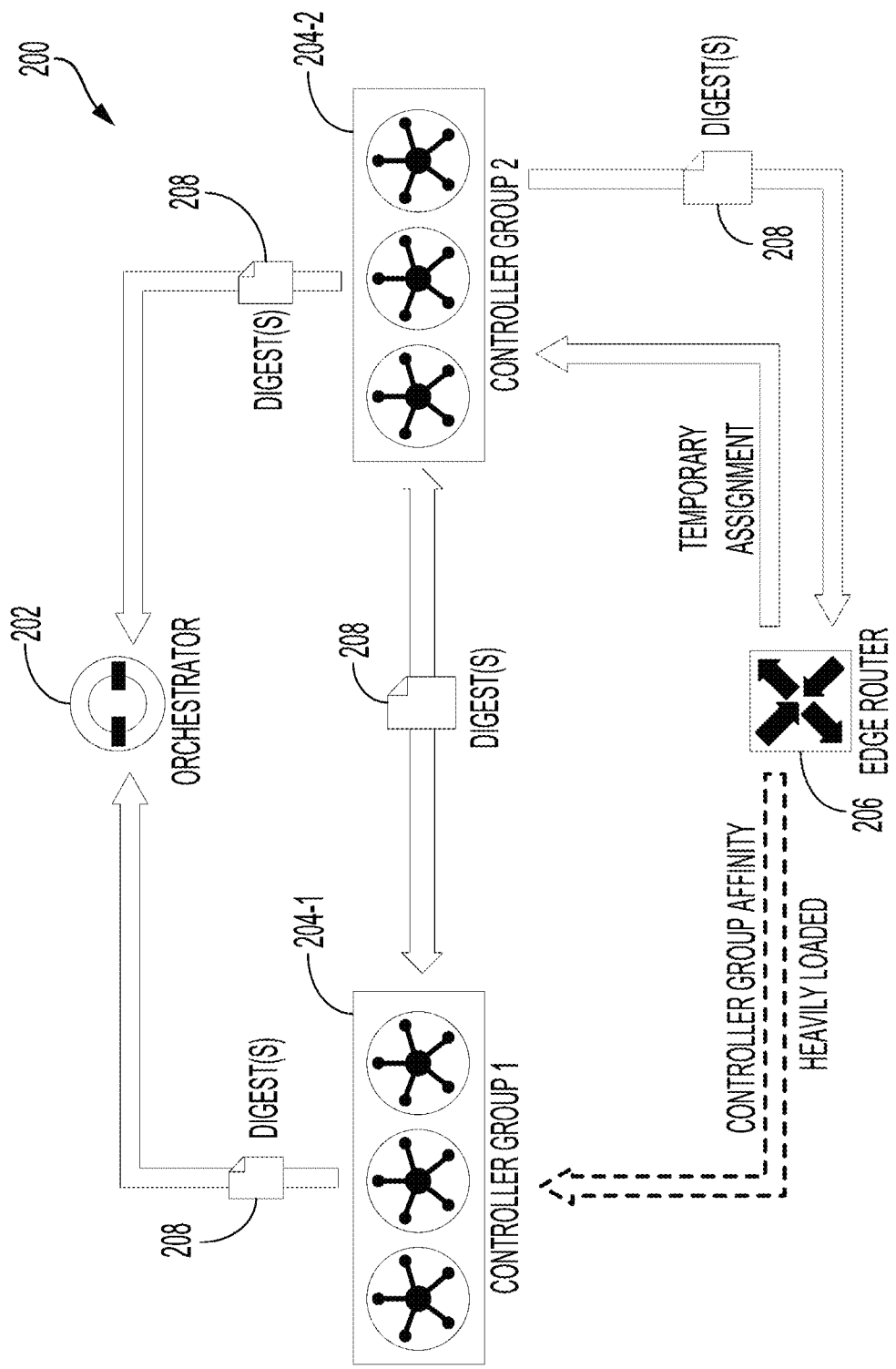

SELF-HEALING SD-WAN CONTROLLERS AND NETWORKS

TECHNICAL FIELD

The present disclosure generally relates to the field of computer networking, particularly with regard to the re-balancing and healing of a Software-Defined Wide Area Network (SD-WAN) in an unbalanced state and/or experiencing one or more failure states.

BACKGROUND

SD-WAN was developed to provide various advantages over traditional Wide Area Networks (WANs). For instance, SD-WANs may provide methods for prioritizing critical network traffic and take advantage of Internet broadband connections to connect directly to multi-cloud resources. Further, SD-WANs may simplify the management of WAN fabrics with controller-first overlays that are independent of transport layers (e.g., MPLS, Ethernet, Internet, Long-Term Evolution (LTE) networks, 5G networks, etc.). SD-WAN controllers may be configured to choose among the available transport mediums to deliver optimal application performance as defined through service level agreements (SLAs).

In an SD-WAN, an SD-WAN edge device (e.g., edge router, etc.) may need to connect to at least one SD-WAN controller. This connection may be facilitated by an orchestrator. For instance, during initial provisioning or catastrophic event, an edge device may transmit a request to the orchestrator to determine which SD-WAN controllers the edge device is to connect to. This controller selection may be performed based on statis hashing of all available controllers to ensure that the edge device will continue connecting to the same set of controllers. This provides a deterministic behavior but does not take into account controller peer distribution and load. Further, when there is any control plane disruption in the overlay, resulting in some controllers being inoperative, edge devices may return to the orchestrator and attempt to connect to other operational controllers. This can result in these operational controllers becoming overloaded and unstable. Thus, there is a need to address these issues in an automatic fashion and to provide self-healing capabilities in SD-WANs involving controller clusters working in conjunction with an orchestrator.

BRIEF DESCRIPTION OF THE FIGURES

To provide a more complete understanding of the present disclosure and features and advantages thereof, reference is made to the following description, taken in conjunction with the accompanying drawings, in which:

FIGS. 2A and 2B show an illustrative example of an environment in which an orchestrator of an SD-WAN evaluates controller group preferences associated with an edge device and load information for controllers in different controller groups to dynamically perform controller selection for the edge device in accordance with at least one embodiment;

DETAILED DESCRIPTION

Figure 1A:
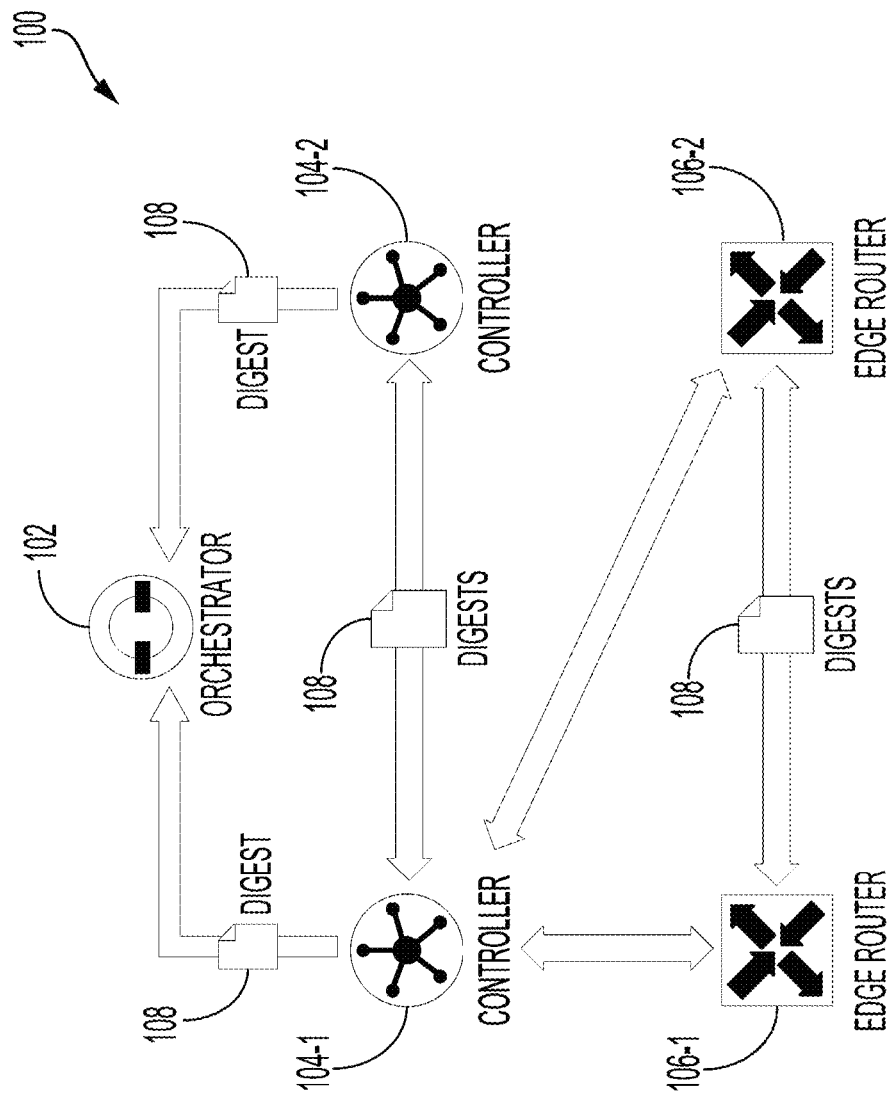
FIGS. 1A and 1B show an illustrative example of an environment in which load information digest messages from different controllers within an SD-WAN are dynamically processed to perform Overlay Management Protocol (OMP) load shedding and to assign one or more controllers to an edge device in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems and methods for re-balancing and healing of an SD-WAN in an unbalanced state and/or experiencing one or more failure states.

In an example, a computer-implemented method comprises receiving network load information associated with a set of centralized controllers within an SD-WAN. The computer-implemented method further comprises detecting a request to connect to a new centralized controller. The request is associated with an edge router within the SD-WAN. Further, the request is detected as a result of OMP load shedding from a first centralized controller of the set of centralized controllers. The computer-implemented method further comprises processing the network load information to identify one or more other centralized controllers of the set of centralized controllers capable of handling load requirements associated with the edge router. The computer-implemented method further comprises determining a preferred controller group associated with the edge router. The preferred controller group corresponds to a subset of centralized controllers from the set of centralized controllers. The computer-implemented method further comprises selecting a second centralized controller from the set of centralized controllers. The second centralized controller is selected according to the identified one or more other centralized controllers and the preferred controller group. The computer-implemented method further comprises transmitting a request to the edge router to connect to the second centralized controller.

In an example, the second centralized controller belongs to a controller group other than the preferred controller group. Further, the second centralized controller is selected as a result of a determination that centralized controllers in the preferred controller group are incapable of handling the load requirements.

In an example, the OMP load shedding from the first centralized controller is performed as a result of the first centralized controller being incapable of handing the load requirements and a determination that other centralized controllers of the set of centralized controllers are capable of handing the load requirements.

In an example, the first centralized controller removes routes from the edge router and routes previously sent to the edge router as a result of the OMP load shedding.

In an example, the second centralized controller is selected as a result of the second centralized controller belonging to the preferred controller group.

In an example, the computer-implemented method further comprises detecting that one or more centralized controllers have been added to the preferred controller group. The computer-implemented method further comprises determining that the edge router is assigned to the second centralized controller. The second centralized controller belongs to a non-preferred controller group. The computer-implemented method further comprises transmitting a request to the edge router to connect to the one or more centralized controllers.

In an example, the OMP load shedding is performed based on a geographical proximity of the first centralized controller to the edge router and the load requirements.

In an example, a system comprises one or more processors and memory storing thereon instructions that, as a result of being executed by the one or more processors, cause the system to receive network load information associated with a set of centralized controllers within an SD-WAN. The instructions further cause the system to detect a request to connect to a new centralized controller. The request is associated with an edge router within the SD-WAN. Further, the request is detected as a result of OMP load shedding from a first centralized controller of the set of centralized controllers. The instructions further cause the system to process the network load information to identify one or more other centralized controllers of the set of centralized controllers capable of handling load requirements associated with the edge router. The instructions further cause the system to determine a preferred controller group associated with the edge router. The preferred controller group corresponds to a subset of centralized controllers from the set of centralized controllers. The instructions further cause the system to select a second centralized controller from the set of centralized controllers. The second centralized controller is selected according to the identified one or more other centralized controllers and the preferred controller group. The instructions further cause the system to transmit a request to the edge router to connect to the second centralized controller.

In an example, a non-transitory computer-readable storage medium stores thereon executable instructions that, as a result of being executed by one or more processors of a computer system, cause the computer system to receive network load information associated with a set of centralized controllers within an SD-WAN. The executable instructions further cause the computer system to detect a request to connect to a new centralized controller. The request is associated with an edge router within the SD-WAN. Further, the request is detected as a result of OMP load shedding from a first centralized controller of the set of centralized controllers. The executable instructions further cause the computer system to process the network load information to identify one or more other centralized controllers of the set of centralized controllers capable of handling load requirements associated with the edge router. The executable instructions further cause the computer system to determine a preferred controller group associated with the edge router. The preferred controller group corresponds to a subset of centralized controllers from the set of centralized controllers. The executable instructions further cause the computer system to select a second centralized controller from the set of centralized controllers. The second centralized controller is selected according to the identified one or more other centralized controllers and the preferred controller group. The executable instructions further cause the computer system to transmit a request to the edge router to connect to the second centralized controller.

Description of Example Embodiments

Figure 6:
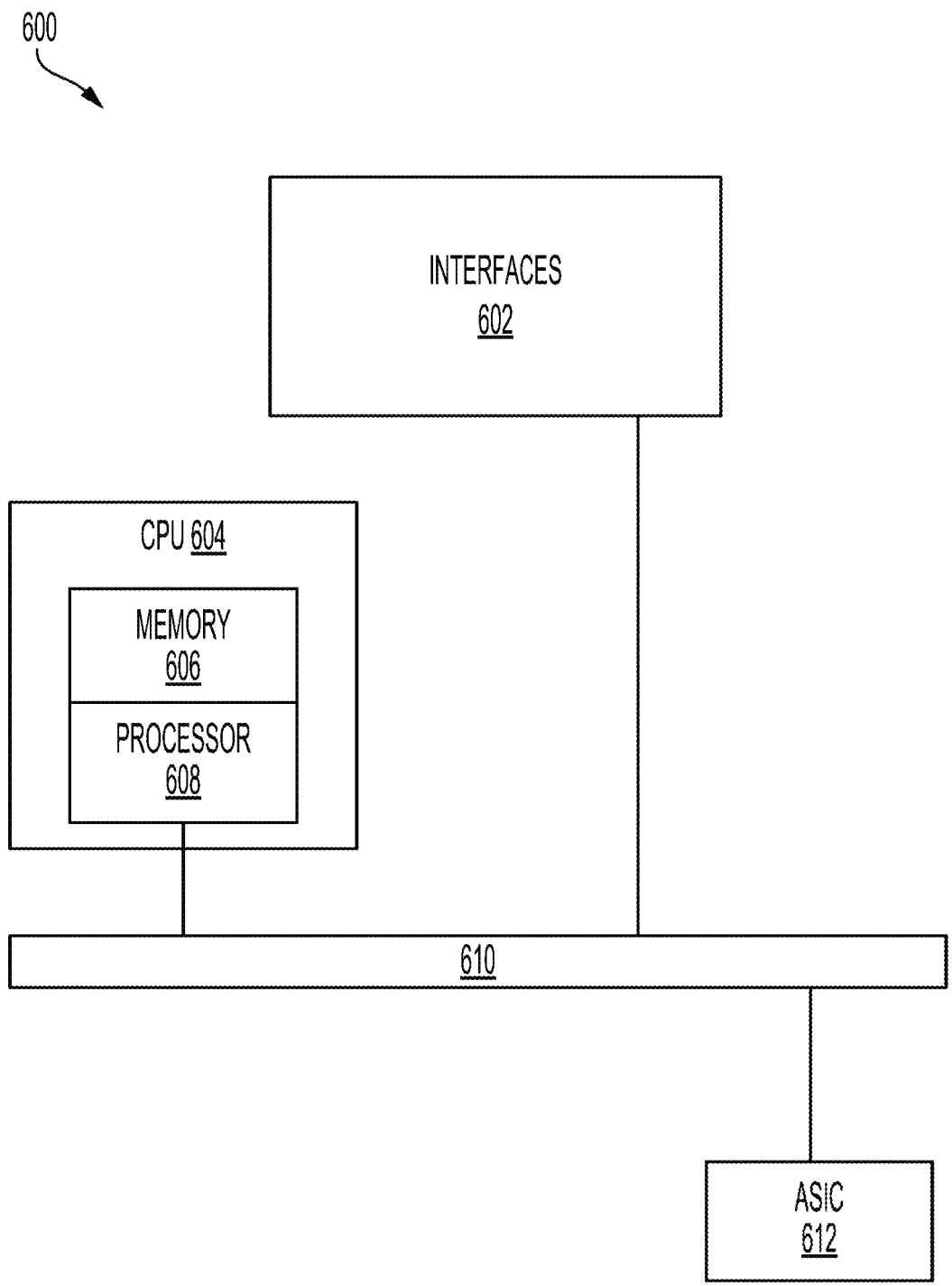
FIG. 6 illustrates an example network device suitable for performing switching, routing, and other networking operations in accordance with some embodiments.
Figure 7:
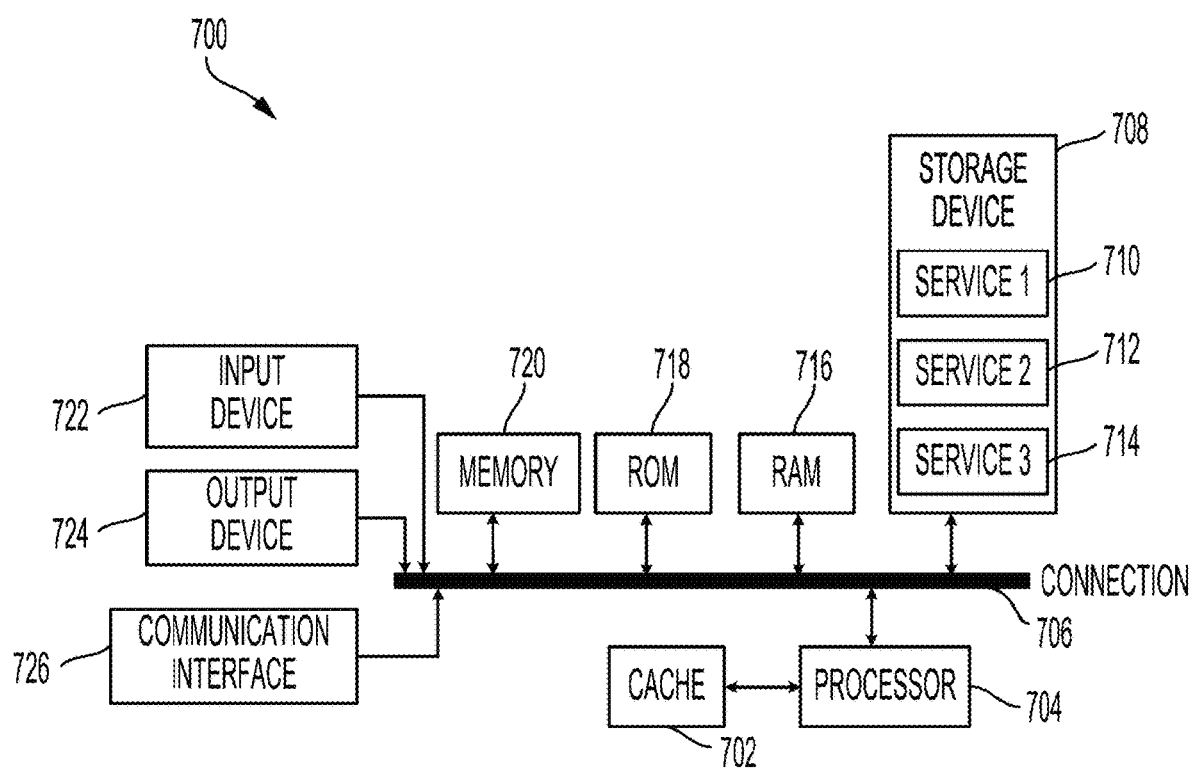
FIG. 7 illustrates a computing system architecture including various components in electrical communication with each other using a connection in accordance with some embodiments.

Disclosed herein are systems and methods for re-balancing and healing of an SD-WAN in an unbalanced state and/or experiencing one or more failure states. The present technologies will be described in more detail in the following disclosure as follows. The discussion begins with a detailed description of example systems, processes and environments for performing the aforementioned determinations and predictions, as illustrated in FIGS. 1A-1B, 2A-2B, and 3 through 5. The discussion concludes with a description of an example network and computing devices, as illustrated in FIGS. 6 and 7.

Figure 1B:
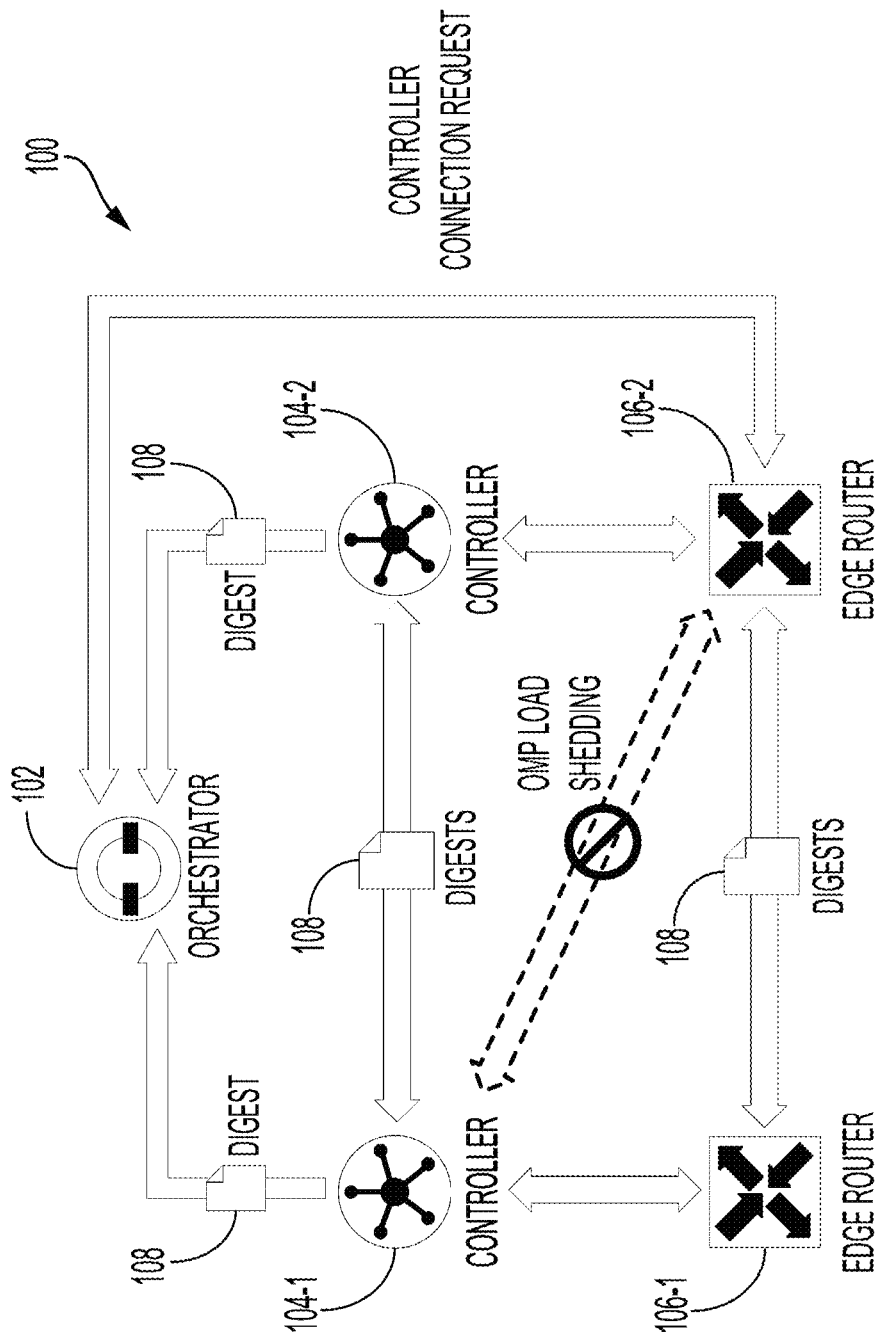

FIGS. 1A and 1B show an illustrative example of an environment 100 in which load information digest messages 108 from different controllers within an SD-WAN are dynamically processed to perform OMP load shedding and to assign one or more controllers to an edge device in accordance with at least one embodiment. In the environment 100, and as illustrated in FIG. 1A, an SD-WAN is provided. The SD-WAN may include a set of centralized controllers (e.g., controller 104-1 and controller 104-2) that are configured to oversee the control plane of the SD-WAN fabric. These centralized controllers may manage provisioning, maintenance, and security for the SD-WAN. The SD-WAN may further include an orchestrator 102, which may be configured to automatically authenticate edge devices (e.g., edge router 106-1 and edge router 106-2) when they join the SD-WAN.

In an embodiment, the centralized controllers 104-1 and 104-2 within the SD-WAN automatically distribute load information to the orchestrator 102. The load information may be distributed to the orchestrator 102 periodically (e.g., every fifteen minutes, every thirty minutes, every hour, etc.) in the form of digest messages 108. These digest messages 108 may indicate the current central processing unit (CPU) and memory load information for the respective centralized controllers.

In an embodiment, if the load for a particular centralized controller exceeds a load threshold for the centralized controller, the centralized controller can distribute digest messages indicating its current load at a greater frequency to the other centralized controllers within the SD-WAN. For instance, if a centralized controller is initially configured to distribute digest messages 108 every fifteen minutes, and the centralized controller detects that its load exceeds a load threshold for the centralized controller, the centralized controller may automatically distribute new digest messages 108 every ten minutes, thereby increasing the frequency in which it distributes digest messages and indicates that it is heavily burdened. In some instances, the increase in frequency may correspond to the degree to which the centralized controller within the SD-WAN is heavily loaded beyond one or more load thresholds. For instance, as the load increases for the centralized controller, the frequency in which the centralized controller transmits its digest messages to the orchestrator 102 may increase as well.

In an embodiment, the centralized controllers 104-1 and 104-2 may further automatically, and periodically, distribute digest messages 108 to each other and to any edge devices connected to these centralized controllers 104-1 and 104-2. This may allow the centralized controllers 104-1 and the edge devices (e.g., edge routers 106-1 and 106-2, etc.) to evaluate these digest messages 108 and automatically determine the load of each centralized controller within the SD-WAN. Based on this load evaluation, each centralized controller and edge device within the SD-WAN may know what centralized controllers are available within the SD-WAN and, of these available centralized controllers, which are lightly loaded.

As illustrated in FIG. 1A, centralized controller 104-1 may have established connections to edge routers 106-1 and 106-2. As a result of these established connections to edge routers 106-1 and 106-2, centralized controller 104-1 may be heavily loaded such that its load exceeds a pre-defined load threshold for the centralized controller 104-1. Accordingly, the centralized controller 104-1 may increase the frequency in which it distributes digest messages indicating its elevated load to the orchestrator 102, the other centralized controllers within the SD-WAN (e.g., centralized controller 104-2), and the edge routers 106-1 and 106-2. The centralized controller 104-1 may further receive a digest message 108 from centralized controller 104-2, which may indicate that centralized controller 104-2 is lightly loaded and capable of accepting connections with one or more edge devices within the SD-WAN.

In an embodiment, a centralized controller (such as centralized controller 104-1) may perform OMP load shedding of one or more edge devices connected to the centralized controller when the centralized controller detects that it is heavily loaded and that one or more other centralized controllers within the SD-WAN are lightly loaded. Returning to the example described above, where centralized controller 104-1 is heavily loaded and centralized controller 104-2 is lightly loaded, the centralized controller 104-1 may determine, based on the digest message 108 from centralized controller 104-2 and detection of a high level of load, that OMP load shedding may be performed.

If the centralized controller 104-1 determines that OMP load shedding may be performed in order to reduce its load, the centralized controller 104-1 may select one or more edge devices connected to the centralized controller 104-1 and terminate the OMP sessions to the selected one or more edge devices. The centralized controller 104-1 may transmit a notification to these one or more edge devices to indicate the reason for terminating these OMP sessions (e.g., load reduction). To determine which OMP sessions are to be terminated, the centralized controller 104-1 may rank the connected edge devices according to a set of criteria. For instance, the centralized controller 104-1 may rank the connected edge devices according to their geographical proximity to the centralized controller 104-1 and to the ratio of rib-out memory consumption for each edge device to the total memory consumption for the centralized controller 104-1 (e.g., the load factor). As an illustrative example, an edge device that is geographically distant from the centralized controller 104-1 and that has a high memory consumption ratio may be ranked higher compared to another edge device that may be geographically closer to the centralized controller 104-1 and that has a lower memory consumption ratio.

In some instances, the centralized controller 104-1 may further rank the edge devices connected to the centralized controller 104-1 according to the controller group preferences of these edge devices. For instance, if the load factor for the edge devices connected to the centralized controller 104-1 is comparable and these edge devices are relatively equidistant to the centralized controller 104-1, the centralized controller 104-1 may determine the controller group preference for each of these edge devices. Any edge devices having a controller group preference corresponding to a controller group that does not include centralized controller 104-1 may be selected for OMP load shedding, as these edge devices may be assigned temporarily to the controller group to which the centralized controller 104-1 belongs to.

Referring to FIG. 1B, the centralized controller 104-1 has selected edge router 106-2 for OMP load shedding. Accordingly, the centralized controller 104-1 may transmit a notification to edge router 106-2 to indicate that the OMP session with the edge router 106-2 is being terminated and the reason for the OMP session termination (e.g., the load factor for the edge router 106-2 is too high, the edge router 106-2 is geographically distant, the controller group preference of the edge router 106-2 does not correspond to the controller group of the centralized controller 104-1, etc.). Once the OMP session has been terminated, the centralized controller 104-1 may drop all routes learned from the edge router 106-2 and/or sent to the edge router 106-2. This may result in a reduction in memory usage for the centralized controller 104-1.

In an embodiment, the centralized controller 104-1, as a result of being in a highly loaded state, will not accept new OMP sessions from edge devices in the SD-WAN. However, the centralized controller 104-1 may continue to accept new OMP sessions from other centralized controllers within the SD-WAN in order to keep the full controller mesh within the SD-WAN intact. This may ensure that the load on the centralized controller 104-1 is kept manageable in the interim period when the orchestrator 102 has not processed the digest message 108 from the centralized controller 104-1 indicating the updated load on the centralized controller 104-1.

The edge router 106-2, whose OMP session with the centralized controller 104-1 was terminated, may continue to receive routing updates from the other centralized controllers that they are connected to. In an embodiment, in response to the OMP session with the centralized controller 104-1 being terminated, the edge router 106-2 may transmit a request to the orchestrator 102 to identify another centralized controller that the edge router 106-2 may connect to. As noted above, the orchestrator 102 may periodically receive digest messages 108 from the different centralized controllers within the SD-WAN (e.g., centralized controllers 104-1 and 104-2), which the orchestrator 102 may use to evaluate the load of each of the centralized controllers. Returning to the example illustrated in FIGS. 1A and 1B, the orchestrator 102, based on its evaluation of the digest messages 108 from centralized controllers 104-1 and 104-2, may determine that centralized controller 104-1 is heavily loaded and that centralized controller 104-2 is lightly loaded. Accordingly, the orchestrator 102 may assign the edge router 106-2 to centralized controller 104-2.

In some instances, if a new centralized controller is provisioned for the SD-WAN, the other centralized controllers within the SD-WAN and the orchestrator 102 may receive digest messages 108 from this new centralized controller. As this new centralized controller is newly provisioned for the SD-WAN, the new centralized controller may be lightly loaded. Accordingly, if the other centralized controllers in the SD-WAN are highly loaded, these other centralized controllers may perform OMP load shedding of high-impact edge devices, causing these high-impact edge devices to transmit requests to the orchestrator 102 to assign these edge devices to different centralized controllers. The orchestrator 102 may evaluate the different digest messages 108 from the centralized controllers within the SD-WAN (including from the newly provisioned centralized controller) to determine that the new centralized controller is lightly loaded. As a result, the orchestrator 102 may assign the previously evicted edge devices to the newly provisioned centralized controller, reducing the load factor for the other centralized controllers in the SD-WAN.

In an embodiment, the illustrative example provided in the environment 100 and as illustrated in FIGS. 1A-1B is applicable in OMP graceful restart (GR) scenarios when switching between different centralized controllers. For instance, because the OMP load shedding performed by centralized controller 104-1 is performed gracefully by notifying the edge router 106-2 ahead of time, a special handling procedure may be performed for OMP GR scenarios. As an illustrative example of this special handling procedure, the OMP on the centralized controller 104-1 may drop all routes learned from the edge router 106-2 and sent to the edge device 106-2. This may result in immediate memory reduction on the centralized controller 104-1 as opposed to traditional OMP GR procedures, which would result in the centralized controller 104-1 retaining these routes over the duration of these GR scenarios.

In this illustrative example, and during an OMP GR scenario, the edge router 106-2 may retrain the routes learned from the centralized controller 104-1 in the GR state only until the edge router 106-2 is able to connect to the centralized controller 104-2, as illustrated in FIG. 1B. Once the edge router 106-2 has successfully connected to the centralized controller 104-2, the edge router 106-2 may remove all the routes learned from the centralized controller 104-1. This process of removing the routes learned from the centralized controller 104-1 may be performed without waiting for the end of the traditional GR timeout period. This has the benefit of avoiding load spikes on the edge router 106-2. Further, the edge router 106-2 may not attempt to connect to the centralized controller 104-1 again by itself, instead requiring the orchestrator 102 to assign the edge router 106-2 to the centralized controller 104-1.

In an embodiment, if an edge router receives a set of peer disconnect events from all of the centralized controllers that the edge router is connected to, the edge router will keep the last disconnected centralized controller in a GR state. Further, the edge router may remove any other peers and memory associated with rib-ins from these peers. Thus, this special GR handling may be performed whenever an edge router or other edge device moves from one centralized controller to another centralized controller due to load or other factors (e.g., re-assignment to a preferred controller group, etc.).

Figure 2B:
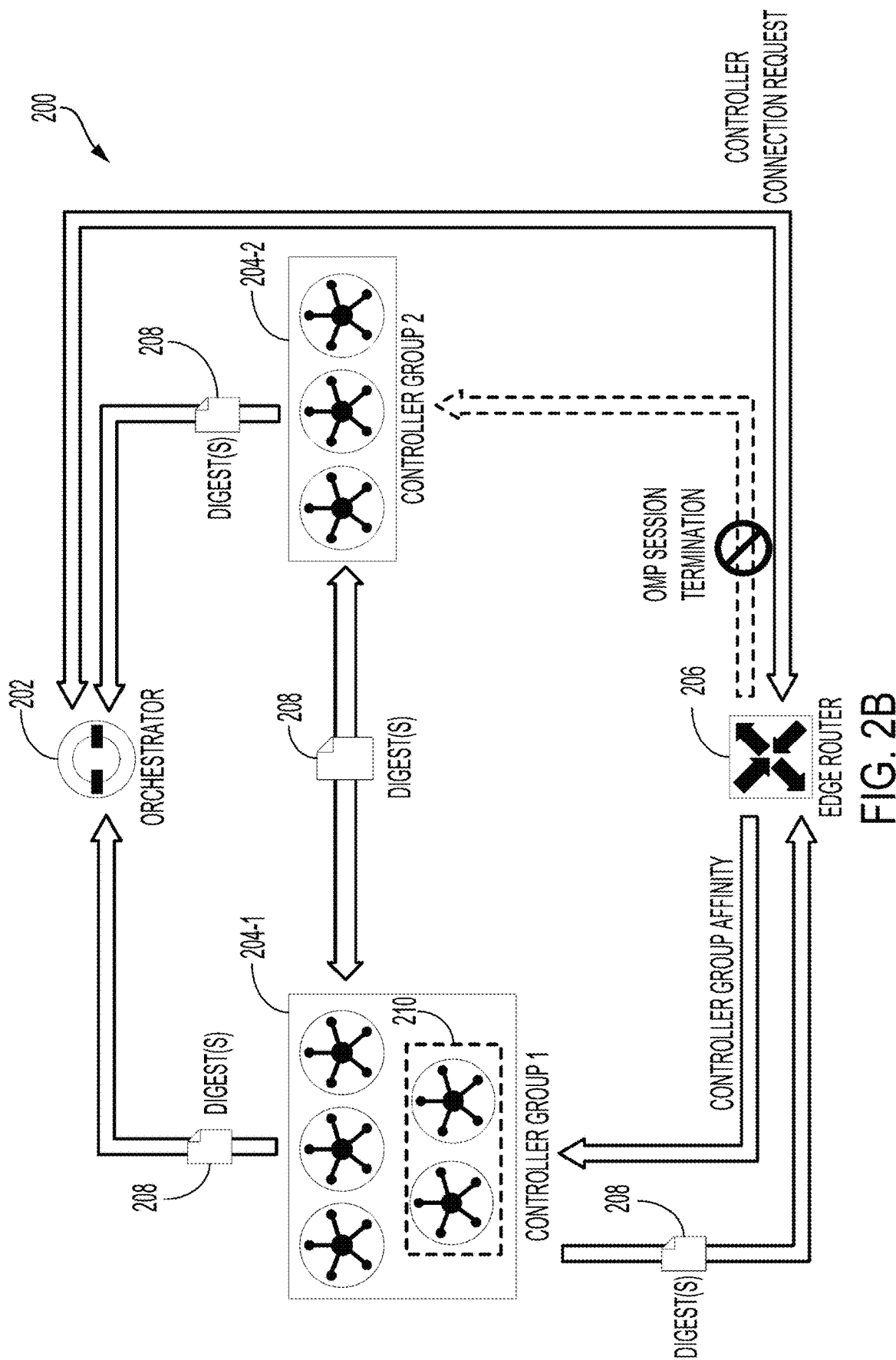

FIGS. 2A-2B show an illustrative example of an environment 200 in which an orchestrator 202 of an SD-WAN evaluates controller group preferences associated with an edge device and load information for centralized controllers in different controller groups to dynamically perform controller selection for the edge device in accordance with at least one embodiment. In the environment 200, the myriad centralized controllers in the SD-WAN are arranged into distinct controller groups, namely controller group 204-1 and controller group 204-2. These controller groups 204-1 and 204-2 may be implemented according to the geographic location of the controllers. For instance, the centralized controllers that comprise the controller group 204-1 may each be located in North America, whereas the centralized controllers that comprise the controller group 204-2 may each be located in Europe. While geographic locations are used extensively throughout the present disclosure, other criteria for defining controller groups may be implemented. For instance, controller groups may be defined according to the configuration of the centralized controllers, whereby a controller group may correspond to centralized controllers having particular configurations and capabilities.

As illustrated in FIG. 2A, an edge router 206 may have a particular controller group preference for controller group 204-1. For instance, if the edge router 206 is geographically located in North America, the edge router 206 may have a controller group preference for controller group 204-1 as a result of controller group 204-1 being proximally located in North America as well. When the orchestrator 202 selects one or more centralized controllers that may be assigned to the edge router 206, the orchestrator 202 may attempt to restrict this selection to centralized controllers that are available in the preferred controller group, as indicated by the edge router 206. Thus, even if the edge router 206 is forced to migrate to a different centralized controller due to load-based re-balancing (as described above in connection with FIGS. 1A-1B), the orchestrator 202 may attempt to re-assign the edge router 206 to other available centralized controllers within the preferred controller group.

In an embodiment, if the orchestrator 202 is unable to identify one or more centralized controllers within the preferred controller group designated by the edge router 206, the orchestrator 202 evaluates centralized controllers in non-preferred controller groups to determine whether any centralized controllers are available. Returning to the example illustrated in FIG. 2A, the orchestrator 202 may evaluate the digest messages 208 from the centralized controllers in controller group 204-1 and determine that these centralized controllers are heavily loaded and unavailable to the edge router 206. Accordingly, the orchestrator 202 may evaluate the digest messages 208 from the centralized controllers in controller group 204-2 to determine whether any of the centralized controllers in controller group 204-2 are available to the edge router 206.

In an embodiment, if the orchestrator 202 determines that one or more centralized controllers in the controller group 204-2 (i.e., the non-preferred controller group) are available to the edge router 206, the orchestrator 202 may temporarily assign the edge router 206 to these one or more centralized controllers in the controller group 204-2. The edge router 206 may establish OMP sessions with these one or more centralized controllers in the controller group 204-2. Further, the edge router 206 may continue to process digest messages 208 from these one or more centralized controllers to monitor the load associated with these one or more centralized controllers and of the other centralized controllers in the SD-WAN. As noted above, the centralized controllers within the SD-WAN may periodically exchange digest messages indicating the load factor for each centralized controller. This may allow each centralized controller to determine the degree to which each other centralized controller within the SD-WAN is heavily loaded. Thus, through these digest messages 208, the edge router 206 may continuously monitor load information corresponding to the centralized controllers in its preferred controller group (i.e., controller group 204-1).

In an embodiment, if the edge router 206 detects that one or more centralized controllers within its preferred controller group have become available (e.g., are not heavily loaded), the edge router 206 may transmit a request to the orchestrator 202 to determine whether the edge router 206 may be re-assigned to these one or more centralized controllers in its preferred controller group. In response to this request, the orchestrator 202 may determine the current assignment for edge router 206. For instance, the orchestrator 202, in response to this request, may determine that the edge router 206 has a preference for controller group 204-1 but is temporarily assigned to controller group 204-2, which is a non-preferred controller group. Accordingly, the orchestrator 202 may evaluate the digest messages 208 corresponding to the centralized controllers in controller group 204-1 to determine whether one or more centralized controllers in controller group 204-1 are available.

Referring to FIG. 2B, an SD-WAN administrator has noticed that controller group 204-1 is heavily loaded and, as a result, has provisioned centralized controllers 210 within controller group 204-1 to address this issue. These centralized controllers 210 may periodically transmit their load information to the other centralized controllers and the orchestrator 202 within the SD-WAN. Accordingly, through the digest messages obtained from the centralized controllers in controller group 204-2, the edge router 206 may determine that centralized controllers 210 are lightly loaded and available within the preferred controller group. Further, the orchestrator 202, based on the digest messages 208 from these centralized controllers 210, may also determine that the centralized controllers 210 are lightly loaded and available. This may cause the orchestrator 202, in response to the request from the edge router 206, to indicate that the edge router 206 may transition from the one or more centralized controllers in controller group 204-2 (i.e., the non-preferred controller group) to the centralized controllers 210 within controller group 204-1 (i.e., the preferred controller group).

In response to the notification from the orchestrator 202, the edge router 206 may terminate the OMP sessions with the one or more centralized controllers of the controller group 204-2, to which it was temporarily assigned. Further, the edge router 206 may establish new OMP sessions with the centralized controllers 210 of the controller group 204-1, thus assigning the edge router 206 to its preferred controller group.

Figure 3:
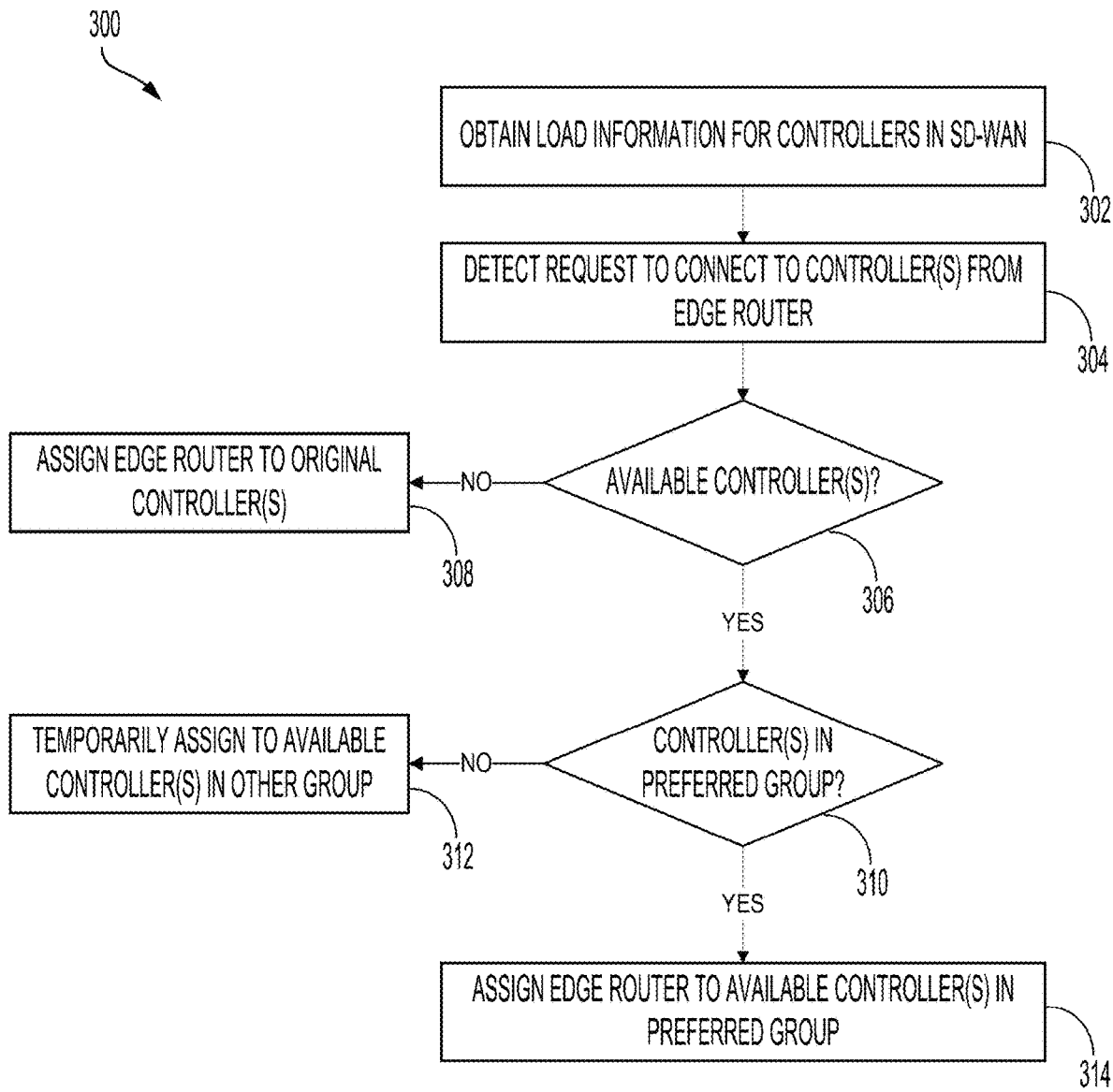
FIG. 3 shows an illustrative example of a process for dynamically evaluating load information associated with different controllers in an SD-WAN and any controller group preferences to assign an edge device to one or more controllers in accordance with at least one embodiment.

FIG. 3 shows an illustrative example of a process 300 for dynamically evaluating load information associated with different controllers in an SD-WAN and any controller group preferences to assign an edge device to one or more controllers in accordance with at least one embodiment. The process 300 may be performed by an orchestrator within an SD-WAN, which may dynamically process connection requests from edge devices joining the SD-WAN and to perform automatic re-balancing of load within the SD-WAN as needed.

At step 302, the orchestrator may obtain load information corresponding to different centralized controllers implemented in the SD-WAN. This load information may be obtained periodically from these different centralized controllers. As noted above, the centralized controllers within the SD-WAN may periodically transmit digest messages to the orchestrator to indicate their load information. The load information for a particular centralized controller may indicate the CPU and memory usage for the centralized controller over a particular period of time. If the load for a particular centralized controller exceeds a pre-defined load threshold, the centralized controller may increase the frequency in which it transmits digest messages to the orchestrator to provide load information for the centralized controller. Thus, the orchestrator may obtain load information for different centralized controllers at different times based on load fluctuations for these different centralized controllers.

At step 304, the orchestrator may detect a request from an edge router to connect to one or more centralized controllers within the SD-WAN. For instance, when an edge router or other edge device joins the SD-WAN, it may submit a request to the orchestrator to facilitate a new connection between the edge router or other edge device with one or more centralized controllers in the SD-WAN. As another illustrative example, when a centralized controller terminates an existing OMP session with a particular edge router or other edge device, the edge router or other edge device may automatically submit a request to the orchestrator to assign the edge router or other edge device to one or more other centralized controllers.

At step 306, the orchestrator may determine whether there are any available centralized controllers that may accommodate the edge router. The orchestrator, for instance, may evaluate the obtained load information from the myriad centralized controllers in the SD-WAN to identify any centralized controllers that may be lightly loaded or that otherwise may be able to satisfy the load requirements of the edge router. If the orchestrator is unable to identify any available centralized controllers for the edge router, the orchestrator, at step 308, may assign the edge router to the original centralized controllers it was originally assigned to. It should be noted that for an edge router that has not been previously assigned to one or more centralized controllers, the orchestrator may initially assign the edge router to one or more centralized controllers that are the most lightly loaded, whether these one or more centralized controllers are in the preferred controller group designated by the edge router or not.

If the orchestrator identifies a set of centralized controllers that are lightly loaded and, thus, available for assignment, the orchestrator may determine, at step 310, whether any of the centralized controllers in the set are within the preferred controller group indicated by the edge router. As noted above, the orchestrator may restrict the selection of available centralized controllers to those that are in the preferred controller group designated by the requesting edge router. However, in some instances, the centralized controllers within the preferred controller group may be heavily loaded and, as a result, may be unavailable to the edge router. In such instances, the orchestrator, at step 312, may temporarily assign the edge router to one or more of the available centralized controllers in a non-preferred controller group. The orchestrator and the edge router may continue to monitor the digest messages to determine when one or more centralized controllers within the preferred controller group become available. As noted above, when this occurs, the edge router may terminate the OMP sessions with the centralized controllers in the non-preferred controller group and return to the orchestrator for a new assignment, thereby restarting the process 300 for this new request.

If the orchestrator determines that one or more centralized controllers are available within the preferred controller group, the orchestrator, at step 314, may assign the edge router to these one or more centralized controllers in the preferred controller group. The orchestrator may transmit a notification to the edge router to indicate that the edge router may establish a connection with the identified one or more centralized controllers in the preferred controller group. In response to this notification, the edge router may establish new OMP sessions with these one or more centralized controllers.

Figure 4:
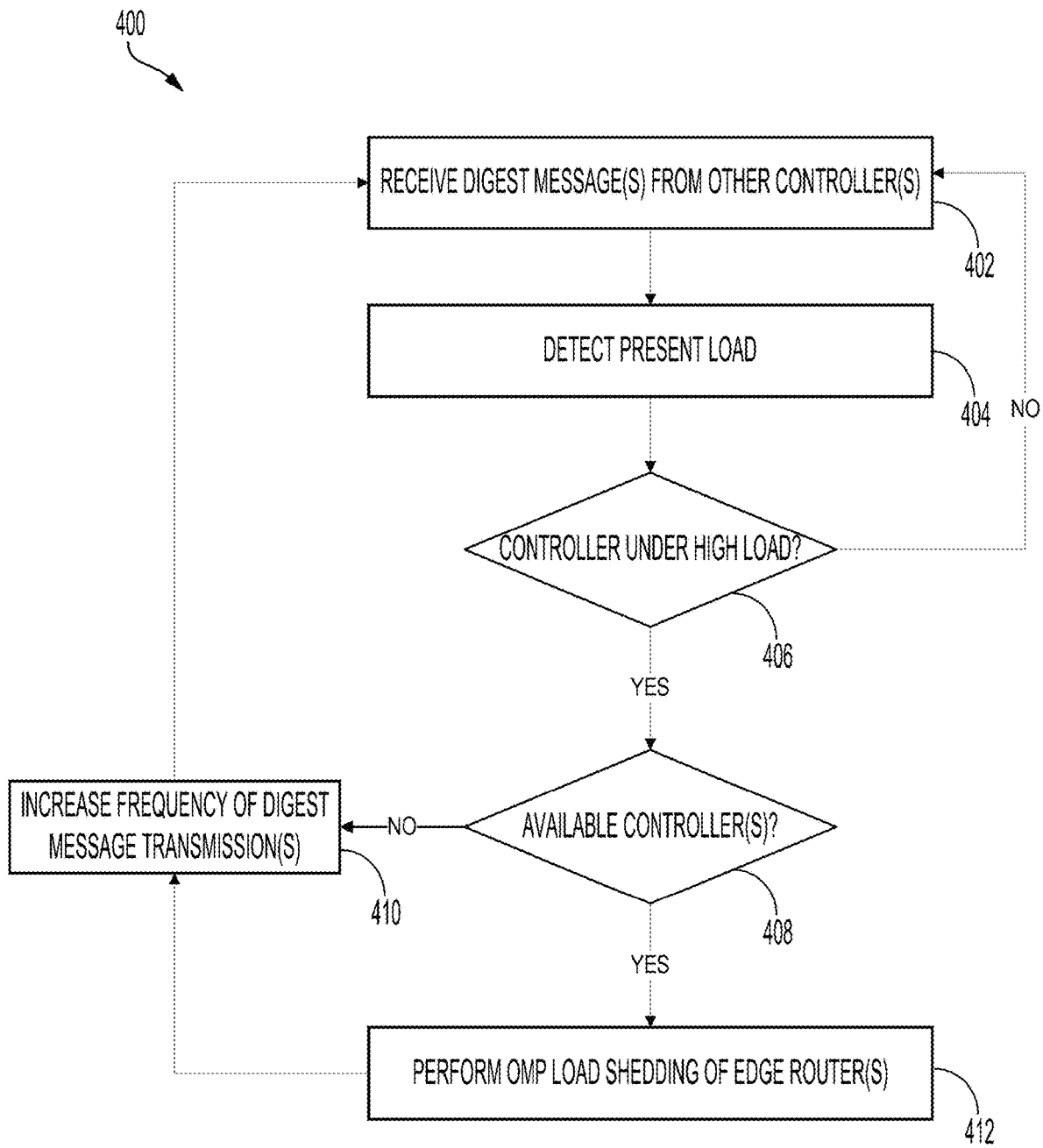
FIG. 4 shows an illustrative example of a process for performing OMP load shedding based on an evaluation of current load and availability of other controllers within an SD-WAN in accordance with at least one embodiment.

FIG. 4 shows an illustrative example of a process 400 for performing OMP load shedding based on an evaluation of current load and availability of other controllers within an SD-WAN in accordance with at least one embodiment. The process 400 may be performed by a centralized controller implemented within an SD-WAN and that is connected to one or more edge routers and/or other edge devices through existing OMP sessions.

At step 402, the centralized controller may receive digest messages from other centralized controllers within the SD-WAN. As noted above, a digest message from a particular centralized controller may include load information that indicates the present CPU and memory load for the particular centralized controller. These digest messages may be transmitted periodically (e.g., every fifteen minutes, every thirty minutes, every hour, etc.) by the centralized controllers in the SD-WAN. As the load burden increased on a centralized controller, the centralized controller may increase the frequency in which it transmits its load information to other centralized controllers in the SD-WAN. Thus, the centralized controller may receive these digest messages from other centralized controllers at different frequencies and times.

At step 404, the centralized controller may detect its present load burden. For instance, the centralized controller may evaluate the current overall CPU and memory usage for the centralized controller across all present connections. Further, the centralized controller may determine, for each connection (e.g., OMP session), the ratio of rib-out memory consumption for the edge router or other edge device associated with the connection to the total memory consumption for the centralized controller. This ratio may be defined as the load factor for the edge router or other edge device, as described above.

At step 406, the centralized controller may determine, based on its present load burden, whether the centralized controller is under a high load burden. For instance, the centralized controller may evaluate its present load burden according to one or more load thresholds for the centralized controller. These load thresholds may provide indicators that the centralized controller is heavily loaded and may be unable to satisfy the requirements of the edge routers and/or other edge devices that are connected to the centralized controller. Further, these load thresholds may serve as indicators that the centralized controller is unstable and/or is unable to sustain new OMP sessions.

If the centralized controller determines that it is not currently experiencing a high load burden, the centralized controller may maintain its present OMP sessions with edge routers and other edge devices. Further, the centralized controller may continue to receive and process digest messages from other centralized controllers in the SD-WAN, thereby restarting the process 400. Further, the centralized controller may continuously evaluate its load burden in order to dynamically detect when its load burden exceeds any of the pre-defined load thresholds.

If the centralized controller determines that its load burden exceeds that of any of the pre-defined load thresholds, the centralized controller, at step 408, may determine whether there are any other available centralized controllers that may be able to accommodate a portion of the load burden. As noted above, the centralized controller may periodically receive digest messages from other centralized controllers in the SD-WAN. Through the evaluation of these periodic digest messages, the centralized controller may identify any centralized controllers within the SD-WAN that are lightly loaded or otherwise capable of handling some of the load burden that is causing the centralized controller to become overburdened.

In an embodiment, regardless of whether there are any other available centralized controllers for shedding a portion of its load burden, the centralized controller, at step 410, increases the frequency in which it transmits digest messages to the orchestrator of the SD-WAN, the other centralized controllers in the SD-WAN, and to any edge routers or other edge devices connected to the centralized controller. As noted above, these digest messages may provide load information corresponding to the centralized controller and, accordingly, may indicate that the centralized controller is heavily burdened. The increase in frequency may be proportional to the excess load experienced by the centralized controller in relation to any applicable thresholds. For instance, as the load of the centralized controller increases towards capacity, the frequency in which the centralized controller transmits its digest messages may also increase, providing an indication of urgency corresponding to the burden of the centralized controller.

If the centralized controller determines that one or more other centralized controllers are available in the SD-WAN (e.g., are lightly loaded or otherwise capable of absorbing some of the load burden of the centralized controller), the centralized controller, at step 412, may perform OMP load shedding of one or more edge routers or other edge devices connected to the centralized controller. The centralized controller may select one or more edge routers or other edge devices for OMP load shedding based on a set of criteria. For instance, the centralized controller may evaluate the controller group preference for each edge router or other edge device connected to the centralized controller to identify any edge routers or other edge devices whose controller group preference does not correspond to the controller group that the centralized controller belongs to. These edge routers or other edge devices, as described above, may be temporarily assigned to the centralized controller while awaiting availability of other centralized controllers within their preferred controller groups.

In addition to identifying any edge routers or other edge devices that have different controller group preferences, the centralized controller may determine the load factor for each edge router or other edge device connected to the centralized controller. Based on the load factor and controller group preference for each edge router and/or edge device connected to the centralized controller, the centralized controller may rank these edge routers and other edge devices in order to select the OMP sessions that are to be terminated to perform the OMP load shedding. As an illustrative example, an edge device that has a different preferred controller group and that has a high load factor may be ranked higher compared to another edge device who is in its preferred controller group and that has a lower load factor. It should be noted that if the load factors for the edge routers and other edge devices connected to the centralized controller are similar, the centralized controller may prioritize OMP load shedding for edge routers or other edge devices having different preferred controller groups, as these edge routers or other edge devices may be assigned to the centralized controller temporarily.

Based on this ranking, the centralized controller may shed the OMP sessions with one or more edge routers or other edge devices until the load burden for the centralized controller is below the applicable load thresholds. Further, the centralized controller may transmit a notification to the affected edge routers or other edge devices to indicate the reason for terminating their OMP sessions. Once the OMP session with an edge router or other edge device is terminated, the edge router or other device may transmit a request to the orchestrator in order to identify one or more other centralized controllers that the edge router or other edge device may connect to within the SD-WAN.

Figure 5:
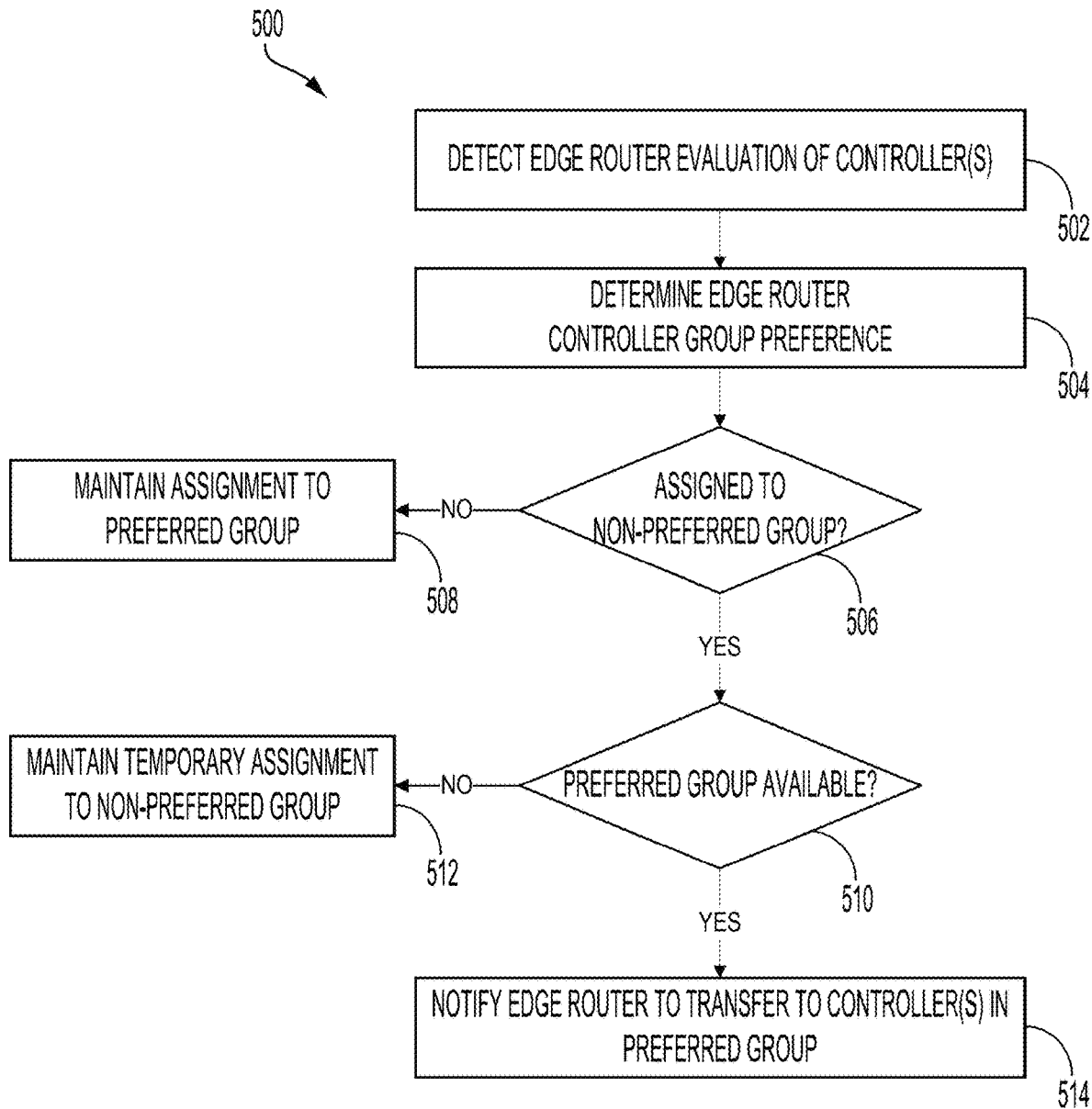
FIG. 5 shows an illustrative example of a process for migrating an edge device to one or more controllers within a preferred controller group in response to edge device evaluation of controllers within an SD-WAN in accordance with at least one embodiment.

FIG. 5 shows an illustrative example of a process 500 for migrating an edge device to one or more controllers within a preferred controller group in response to edge device evaluation of controllers within an SD-WAN in accordance with at least one embodiment. The process 500 may be performed by an orchestrator in an SD-WAN. The global topology of the SD-WAN may be divided into geographic regions, with controller groups being defined according to these geographic regions and the corresponding locations of the centralized controllers that comprise these controller groups.

At step 502, the orchestrator may detect an evaluation of different centralized controllers within the SD-WAN by an edge router or other edge device. For instance, the edge router or other edge device may perform this evaluation in response to having its OMP session terminated by a centralized controller within the SD-WAN. As another illustrative example, the edge router or other edge device may perform this evaluation in response to a determination that one or more centralized controllers within the preferred controller group of the edge router or other edge device are available. This determination may be made by the edge router or other edge device through evaluation of digest messages from centralized controllers that the edge router or other edge device is connected to.

At step 504, the orchestrator may determine the controller group preference of the edge router or other edge device. For instance, when the edge router or other edge device accesses the orchestrator to obtain a centralized controller assignment, the edge router or other edge device may indicate its preferred controller group. Based on this determination, the orchestrator may determine, at step 506, whether the edge router or other edge device is currently assigned to a non-preferred group.

If the orchestrator determines that the edge router or other edge device is currently connected to one or more centralized controllers within its preferred controller group, the orchestrator, at step 508, may maintain this assignment to the preferred controller group. For instance, the orchestrator may identify one or more centralized controllers within the preferred controller group that are lightly loaded and capable of handling the load requirements of the edge router or other edge device. The orchestrator may then assign the edge router or other edge device to these one or more centralized controllers within the preferred controller group. The edge device or other edge device may accordingly establish OMP sessions with these one or more centralized controllers in the preferred controller group.

If the orchestrator determines that the edge router or other edge device is presently assigned to one or more centralized controllers in a non-preferred group, the orchestrator may determine, at step 510, whether there are any centralized controllers within the preferred controller group and to which the edge router or other edge device may be assigned. As noted above, the orchestrator may continuously receive digest messages from different centralized controllers within the SD-WAN. These digest messages may be transmitted by these different centralized controllers periodically according to the load burden experienced by each of these centralized controllers, as noted above. These digest messages may indicate the degree to which each centralized controller within the SD-WAN is heavily loaded.

In an embodiment, if the orchestrator determines that there are no available centralized controllers within the preferred controller group that can accommodate the edge router or other edge device, the orchestrator, at step 512, may maintain the temporary assignment of the edge router or other edge device to the one or more centralized controllers within the non-preferred controller group. The edge router or other edge device may continue to process digest messages from the one or more centralized controllers within the non-preferred controller group to detect when centralized controllers within the preferred controller group become available and, accordingly, submit a request to the orchestrator for reassignment to these centralized controllers in the preferred controller group.

If the orchestrator determines that there are one or more centralized controllers available within the preferred controller group, the orchestrator, at step 514, may notify the edge router or other edge device to transfer from the centralized controllers in the non-preferred controller group to the identified one or more centralized controllers in the preferred controller group. In response to this notification, the edge router or other edge device may terminate the existing OMP sessions with the centralized controllers in the non-preferred controller group. Further, once these OMP sessions have been terminated, the edge route or other edge device may establish new OMP sessions with the identified one or more centralized controllers within the preferred controller group.

FIG. 6 illustrates an example network device 600 suitable for performing switching, routing, and other networking operations in accordance with some implementations. Network device 600 includes a CPU 604, interfaces 602, and a connection 610 (e.g., a Peripheral Component Interconnect (PCI) bus). When acting under the control of appropriate software or firmware, the CPU 604 is responsible for executing packet management, error detection, and/or routing functions. The CPU 604 can accomplish these functions under the control of software including an operating system and any appropriate applications software. The CPU 604 may include one or more processors 608, such as a processor from the Intel® X98 family of microprocessors. In some cases, the processor 608 can be specially designed hardware for controlling the operations of network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC) 612, which can be configured to perform routing and/or switching operations. The ASIC 612 can communicate with other components in the network device 600 via the connection 610, to exchange data and signals and coordinate various types of operations by the network device 600, such as routing, switching, and/or data storage operations, for example.

FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
   receiving network load information associated with a set of controllers within a Software-Defined Wide Area Network (SD-WAN);
   detecting a request to connect to a new controller, wherein the request is associated with an edge router within the SD-WAN, and wherein the request is detected as a result of Overlay Management Protocol (OMP) load shedding from a first controller of the set;
   identifying, based on the network load information, one or more other controllers of the set capable of handling load requirements of the edge router;
   determining a preferred controller group associated with the edge router, wherein the preferred controller group corresponds to a subset of controllers from the set;
   selecting a second controller from the set based on the identified one or more other controllers and the preferred controller group; and
   transmitting a request to the edge router to connect to the second controller.

2. The computer-implemented method of claim 1, wherein:
   the second controller belongs to a controller group other than the preferred controller group; and
   the second controller is selected as a result of a determination that controllers in the preferred controller group are incapable of handling the load requirements.

3. The computer-implemented method of claim 1, wherein the OMP load shedding from the first controller is performed as a result of the first controller being incapable of handing the load requirements and a determination that other controllers of the set are capable of handing the load requirements.

4. The computer-implemented method of claim 1, wherein the first controller removes routes from the edge router and routes previously sent to the edge router as a result of the OMP load shedding.

5. The computer-implemented method of claim 1, wherein the second controller is selected as a result of the second controller belonging to the preferred controller group.

6. The computer-implemented method of claim 1, further comprising:
   detecting that one or more controllers have been added to the preferred controller group;

determining that the edge router is assigned to the second controller, wherein the second controller belongs to a non-preferred controller group; and transmitting a request to the edge router to connect to the one or more controllers.

7. The computer-implemented method of claim 1, wherein the OMP load shedding is performed based on a geographical proximity of the first controller to the edge router and the load requirements.

8. A system, comprising:

one or more processors; and memory storing thereon instructions that, as a result of being executed by the one or more processors, cause the system to:

receive network load information associated with a set of controllers within a Software-Defined Wide Area Network (SD-WAN);

detect a request to connect to a new controller, wherein the request is associated with an edge router within the SD-WAN, and wherein the request is detected as a result of Overlay Management Protocol (OMP) load shedding from a first controller of the set;

identify, based on the network load information, one or more other controllers of the set capable of handling load requirements of the edge router;

determine a preferred controller group associated with the edge router, wherein the preferred controller group corresponds to a subset of controllers from the set;

select a second controller from the set based on the identified one or more other controllers and the preferred controller group; and transmit a request to the edge router to connect to the second controller.

9. The system of claim 8, wherein:

the second controller belongs to a controller group other than the preferred controller group; and the second controller is selected as a result of a determination that controllers in the preferred controller group are incapable of handling the load requirements.

10. The system of claim 8, wherein the OMP load shedding from the first controller is performed as a result of the first controller being incapable of handing the load requirements and a determination that other controllers of the set are capable of handing the load requirements.

11. The system of claim 8, wherein the first controller removes routes from the edge router and routes previously sent to the edge router as a result of the OMP load shedding.

12. The system of claim 8, wherein the second controller is selected as a result of the second controller belonging to the preferred controller group.

13. The system of claim 8, wherein the instructions further cause the system to:

detect that one or more controllers have been added to the preferred controller group;

determine that the edge router is assigned to the second controller, wherein the second controller belongs to a non-preferred controller group; and transmit a request to the edge router to connect to the one or more controllers.

14. The system of claim 8, wherein the OMP load shedding is performed based on a geographical proximity of the first controller to the edge router and the load requirements.

15. A non-transitory, computer-readable storage medium storing thereon executable instructions that, as a result of being executed by one or more processors or a computer system, cause the computer system to:

receive network load information associated with a set of controllers within a Software-Defined Wide Area Network (SD-WAN);

detect a request to connect to a new controller, wherein the request is associated with an edge router within the SD-WAN, and wherein the request is detected as a result of Overlay Management Protocol (OMP) load shedding from a first controller of the set;

identify, based on the network load information, one or more other controllers of the set capable of handling load requirements of the edge router;

determine a preferred controller group associated with the edge router, wherein the preferred controller group corresponds to a subset of controllers from the set;

select a second controller from the set based on the identified one or more other controllers and the preferred controller group; and transmit a request to the edge router to connect to the second controller.

16. The non-transitory, computer-readable storage medium of claim 15, wherein:

the second controller belongs to a controller group other than the preferred controller group; and the second controller is selected as a result of a determination that controllers in the preferred controller group are incapable of handling the load requirements.

17. The non-transitory, computer-readable storage medium of claim 15, wherein the OMP load shedding from the first controller is performed as a result of the first controller being incapable of handing the load requirements and a determination that other controllers of the set are capable of handing the load requirements.

18. The non-transitory, computer-readable storage medium of claim 15, wherein the first controller removes routes from the edge router and routes previously sent to the edge router as a result of the OMP load shedding.

19. The non-transitory, computer-readable storage medium of claim 15, wherein the second controller is selected as a result of the second controller belonging to the preferred controller group.

20. The non-transitory, computer-readable storage medium of claim 15, wherein the executable instructions further cause the computer system to:

detect that one or more controllers have been added to the preferred controller group;

determine that the edge router is assigned to the second controller, wherein the second controller belongs to a non-preferred controller group; and transmit a request to the edge router to connect to the one or more controllers.

* * * * *